Patented Dec. 10, 1929

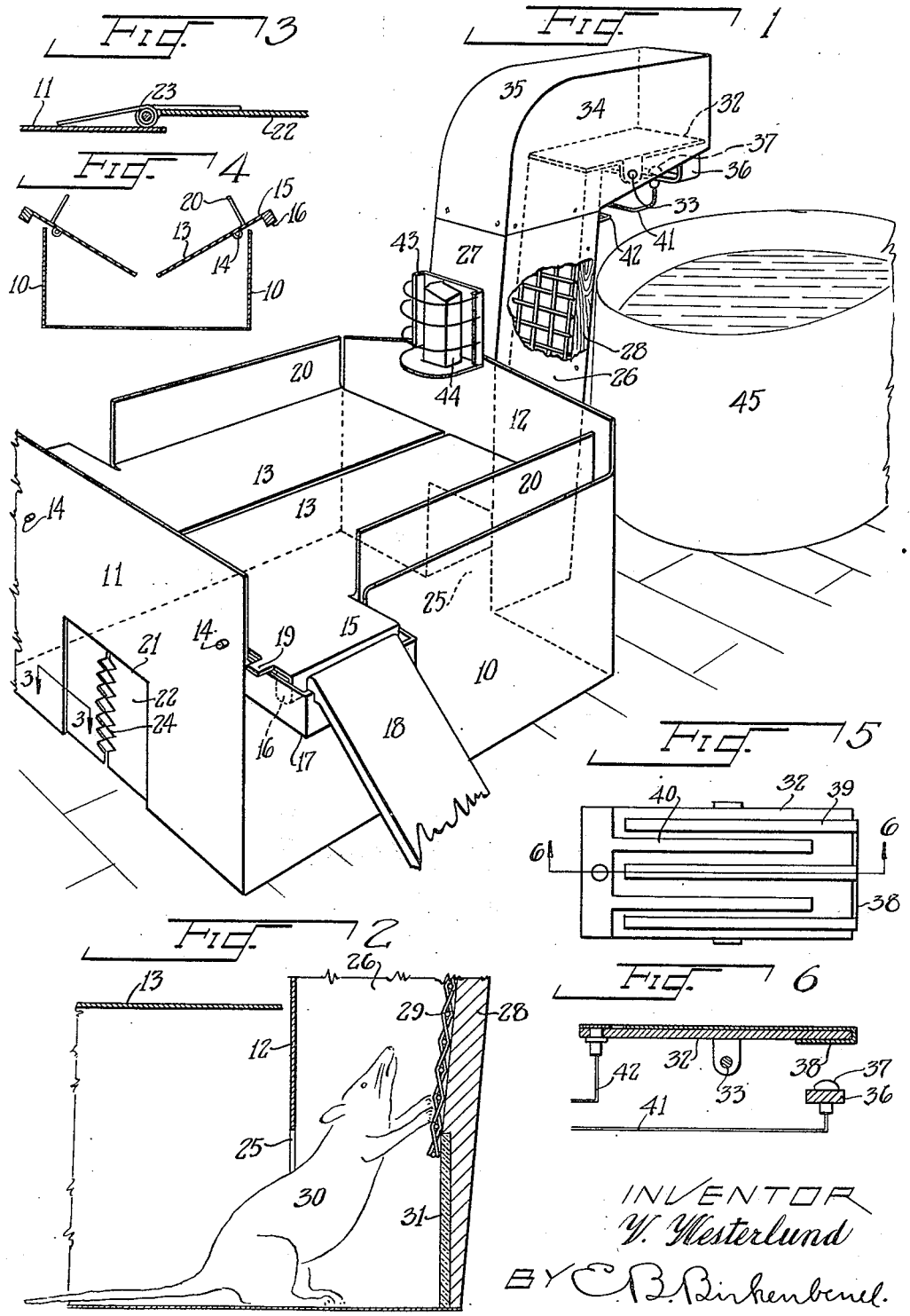

1,738,623

UNITED STATES PATENT OFFICE

VICTOR WESTERLUND, OF PORTLAND, OREGON

TRAP

Application filed December 19, 1927. Serial No. 241,222.

This invention relates generally to traps, and particularly to devices for catching rodents.

The main object of this invention is to provide an exceedingly simple and efficient form of rat trap which will automatically reset itself and will provide a means for catching an unlimited number of rats without attention.

The second object is to so combine the various features of the trap that rats which are ordinarily considered difficult to catch are easily captured thereby.

These, and other objects, will become more apparent from the specification following as illustrated in the accompanying drawing, in which:

Figure 1 is a perspective view of the device with a portion broken away for clearness. Figure 2 is a fragmentary view showing the mirror and ladder arrangement. Figure 3 is a horizontal section taken along the line 3—3 in Figure 1. Figure 4 is a transverse view through the trap showing the platforms in a depressed position. Figure 5 is a plan of the exit floor. Figure 6 is a vertical section taken along the line 6—6 in Figure 5.

Similar numbers of reference refer to similar parts throughout the several views.

Referring in detail to the drawing, the trap itself consists of a boxlike structure comprising the side walls 10, the front 11 and the rear wall 12. The front and rear walls extend somewhat above the side walls 10. Longitudinally along the box are hinged the platforms 13 on the pivots 14 which extend through the walls 11 and 12. Each platform 13 is provided with an outwardly projecting runway 15 to which is attached the counterweight 16 which lies within the frame 17, which also serves to support the end of the runway 18. The runway 15 also has a lateral projection 19 which acts as a stop against the frame 17. Each platform 13 also has an upturned side 20 which extends practically the height of the members 11 and 12.

In the front 11 is provided an opening 21 for the inwardly swinging doors 22 which are provided with light spring hinges 23 and serrated edges 24, through which doors it is possible for a rat to enter the trap, but not to escape, and once he pushes the doors apart far enough to get his head between the doors he cannot back up as the teeth or serrated edges 24 will prevent him from doing so.

At the back of the trap is formed an opening 25 from which leads a sloping runway consisting of the sides 26, the front 27 and the wooden back 28, preferably covered with wire cloth 29, adapted to serve as a ladder for the rodent 30.

It is also preferable to provide a mirror 31 below the foot of the wire cloth 29 for the purpose of diverting the rat's attention and furnishing an incentive for him to enter the doors 22.

At the top of the wire cloth 29 is hinged a floor 32 on the pivot 33 which is mounted in the sides 34 on opposite sides of the floor 32. A cover 35 unites the opposite members 34. A stop 36 is placed on the under side of the floor 32 and carries a contact 37 adapted to engage the metal strip 38, which is connected with the metal strips 39 on the floor 32. Corresponding strips 40 are placed between the strips 39. Lead wires 41 and 42 carry electrical current to the contact 37 and the strips 40, but only, of course, when a short circuit is made between the metal strips.

It is preferable to provide a bait holder 43 for the bait 44 which is preferably mounted on the front 27 of the exit chute just above the back 12.

It is also desirable to provide a water container 45 directly underneath the floor 32 into which the rats must jump when the floor tips under their weight, or when they come in contact with the electrical connections on the floor 32.

The operation of the device is as follows: Assuming that water is placed in the container 45 and bait in the holder 43 the trap is ready for action. In an effort to reach the bait 44 the rat will either pass up the runway 18 to the platform 13, in which event he will fall through into the enclosure; or else he will enter the door 22, as previously suggested. Immediately he will be attracted by his reflection in the mirror 31 which will guide him to the wire cloth or ladder 29 over which he now makes an effort to escape. This is seemingly easy for him to do, so he loses no time going up the ladder onto the floor 32. As he nears the edge his weight tips the floor downwardly and the contact 37 engages the strip 38 and the rat receives an electrical shock, which is either of sufficient intensity to kill him, or at least to make him jump into the container 45 in a partially dazed condition.

By this arrangement it can be seen that the bait is never molested and the trap is never filled, due to the fact that as the rats are caught they automatically dispose of themselves.

It is a well known fact that many forms of rat traps have been constructed, I therefore intend to cover only such forms and modifications thereof as fall fairly within the appended claim.

I claim:

A trap having in combination a box having sides forming an enclosure, a divided top hinged between said sides below the upper edge thereof in a manner that the middle portion of said top may be depressed by the weight of a rodent, each portion of said top having means for urging same toward a horizontal position, each of said top portions having an extension formed thereon projecting through the adjacent upper side, one side of said enclosure having an inlet opening provided with an inwardly opening closure, another side of said enclosure having an outlet opening, an upright duct communicating with said outlet opening having a ladder therein, and a tiltable platform at the upper end of said ladder from which the rodent is discharged.

VICTOR WESTERLUND.